United States Patent [19]
Hanna

[11] 3,934,296
[45] Jan. 27, 1976

[54] WHEEL CLEANERS

[76] Inventor: Daniel C. Hanna, 1133 SW. Rivington Drive, Portland, Oreg. 97201

[22] Filed: Aug. 24, 1972

[21] Appl. No.: 283,544

[52] U.S. Cl. ............ 15/53 B; 15/DIG. 2; 74/231 C; 104/172 B
[51] Int. Cl.² ............................................. B60S 3/04
[58] Field of Search ............ 15/DIG. 2, 21 D, 21 E, 15/21 R, 21 B, 21 C, 53, 97; 104/172 B, 172 CT

[56] References Cited
UNITED STATES PATENTS

| | | | |
|---|---|---|---|
| 3,037,223 | 6/1962 | Lovsey | 15/DIG. 2 |
| 3,554,132 | 1/1971 | Hanna | 104/172 B |

*Primary Examiner*—Edward L. Roberts
*Attorney, Agent, or Firm*—Klarquist, Sparkman, Campbell, Leigh, Hall & Whinston

[57] ABSTRACT

Brushes are held in engagement with car wheels on short spinner sections driven at high speeds to spin the wheels, and vertical pusher conveyor chains are guided under the spinner sections to move the car over and past the spinner sections. In one embodiment, the spinner section includes driven rolls bracketing a path of a pusher arm of the conveyor, and, in an alternate embodiment, the spinner section includes outer-timing belts supporting the wheel and having inner teeth meshing with outer teeth of inner-timing belts coursing inside the outer-timing belts.

10 Claims, 6 Drawing Figures

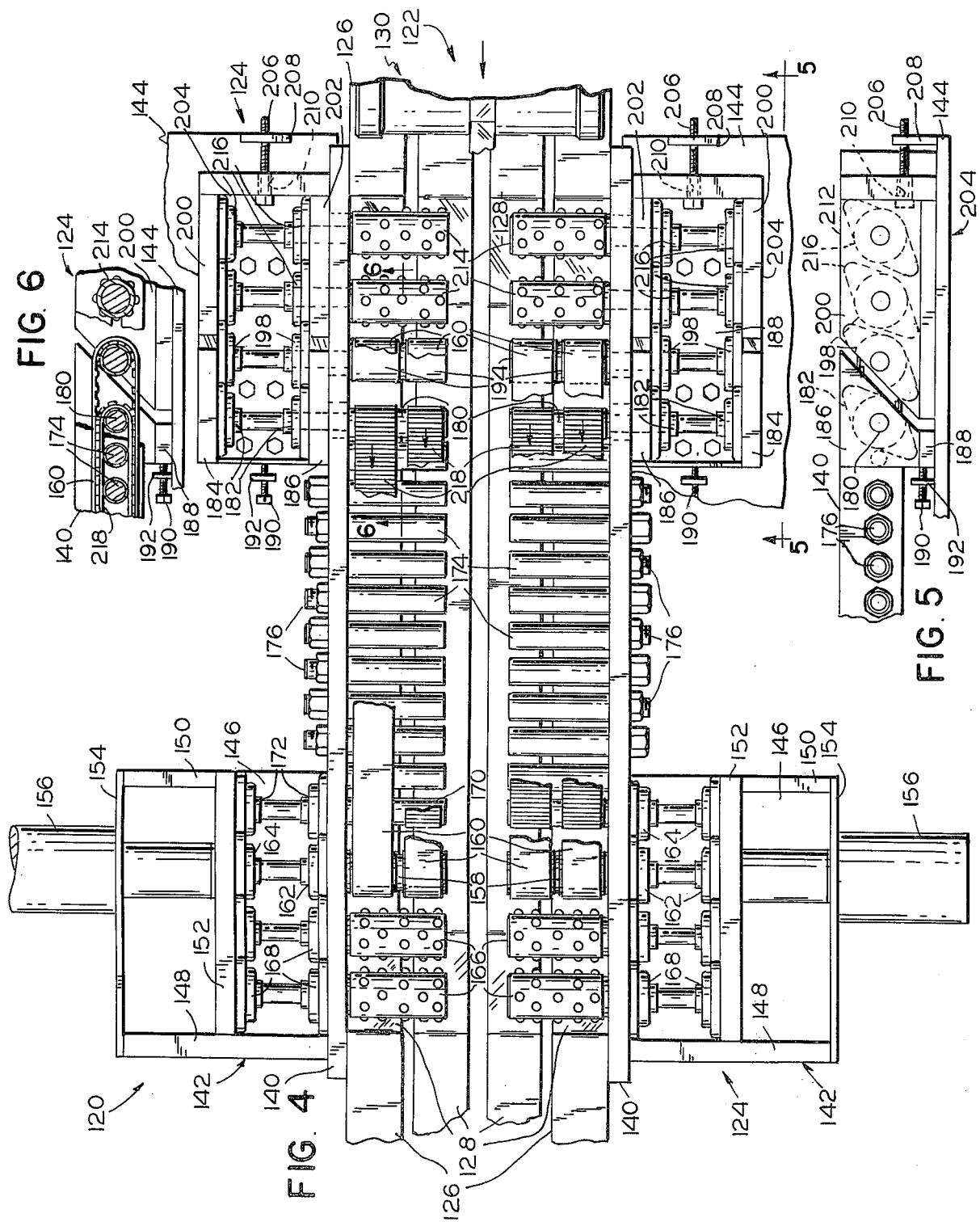

WHEEL CLEANERS

DESCRIPTION

This invention relates to wheel cleaners, and more particularly to combined car wash conveying and wheel cleaning apparatus.

An object of the invention is to provide new and improved wheel cleaners.

Another object of the invention is to provide combined car wash conveying and wheel cleaning apparatus.

A further object of the invention is to provide a car wash having a wheel spinner section in an intermediate portion of a pusher conveyor wherein a chain of the conveyors is guided around the wheel spinner section.

Another object of the invention is to provide a car wash having a wheel spinner having a longitudinal slot through which puller arms of a conveyor pass and a conveyor guide structure which guides a chain of the conveyor below the wheel spinner.

In the drawings:

FIG. 4 is a fragmentary, top plan view of a car wash conveyor and wheel spinner construction forming an alternate embodiment of the invention;

FIG. 5 is a fragmentary, side elevation view taken along line 5—5 of FIG. 4; and FIG. 6 is a fragmentary, vertical sectional view taken along line 6—6 of FIG. 4.

Figure 1:
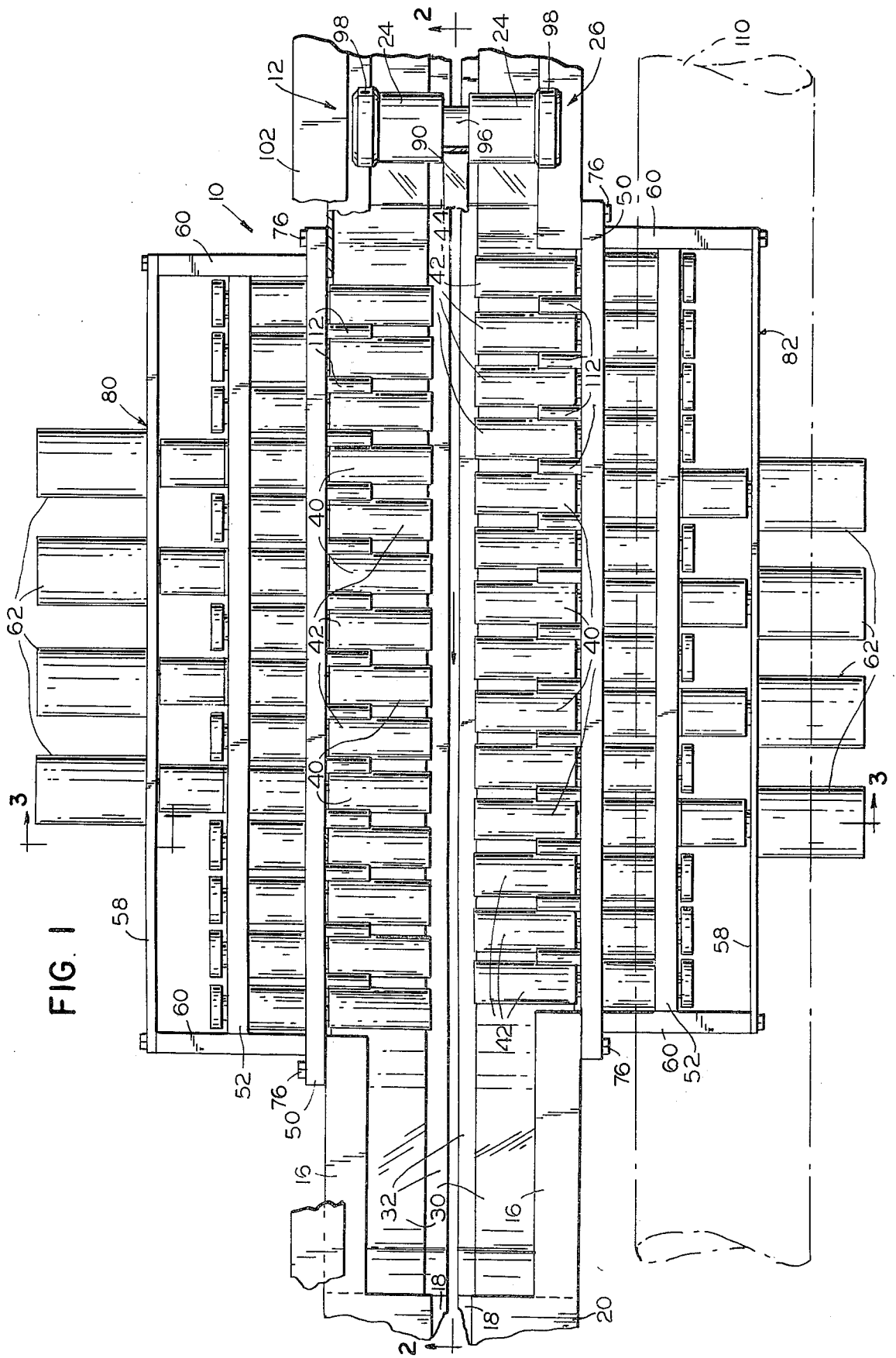
FIG. 1 is a fragmentary, top plan view of a car wash conveyor and wheel spinner construction forming one embodiment of the invention.
Figure 2:
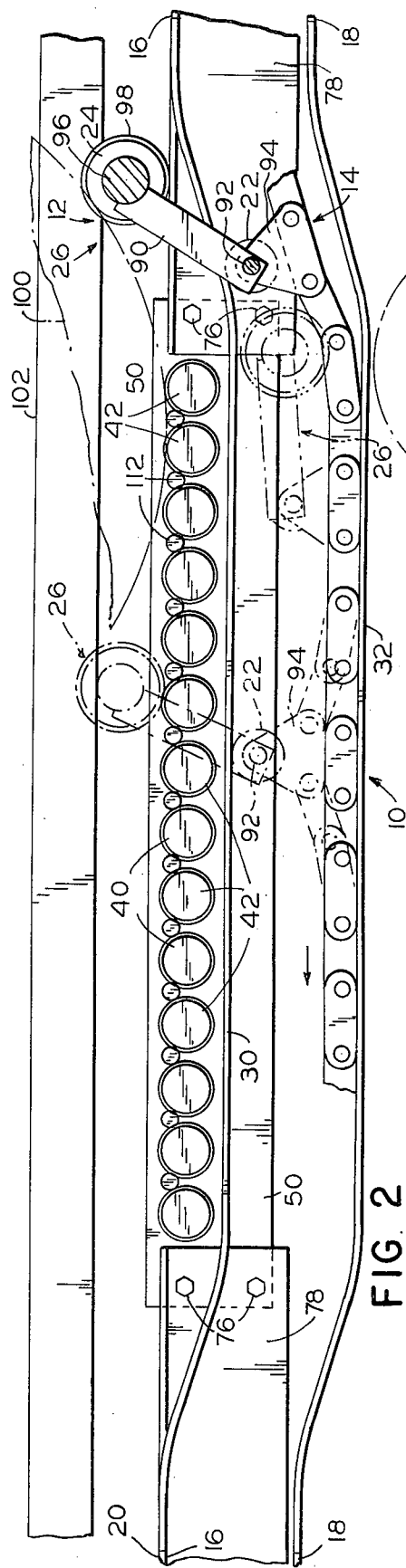
FIG. 2 is a vertical, sectional view taken along line 2—2 of FIG. 1.
Figure 3:
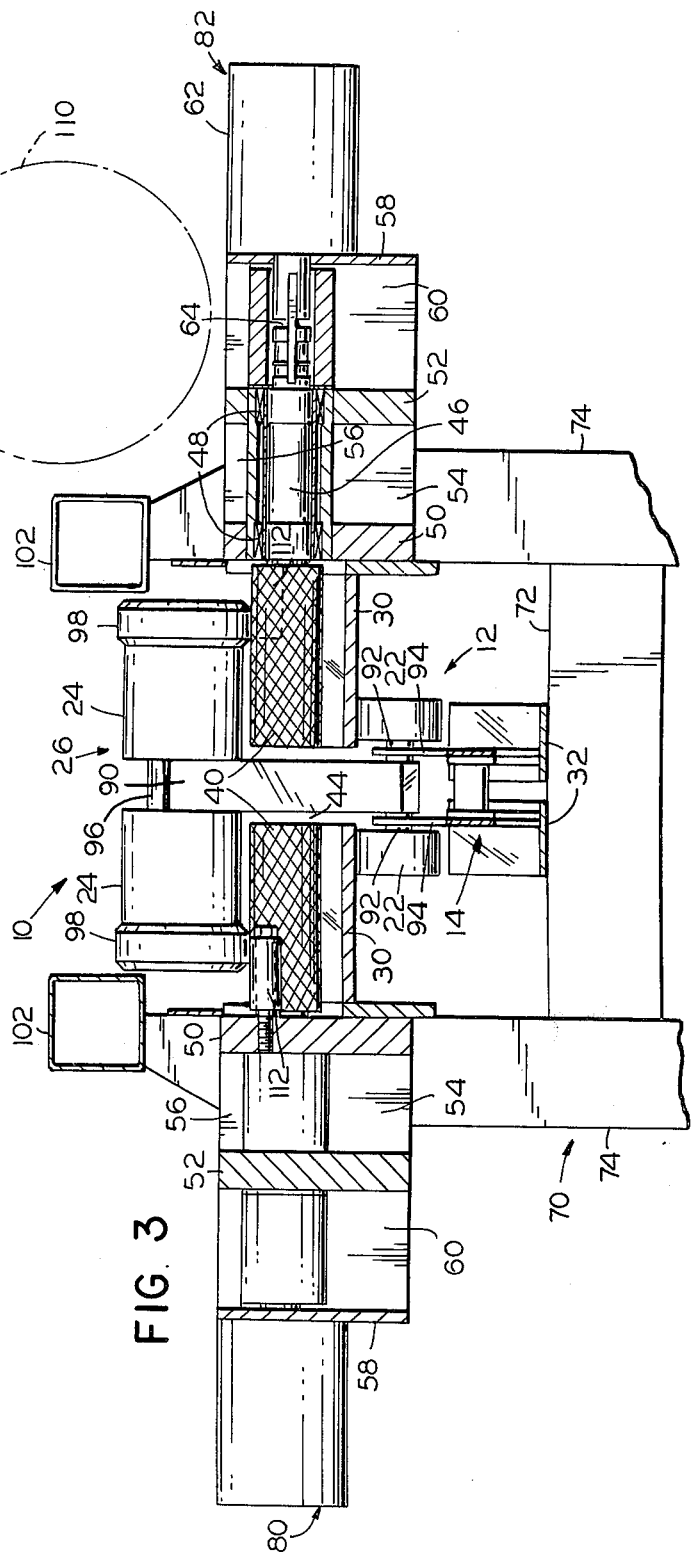
FIG. 3 is an enlarged, fragmentary, vertical sectional view taken along line 3—3 of FIG. 1.

Referring now in detail to the drawings, there is shown in FIGS. 1–3 a car wash conveyor and wheel spinner construction forming one embodiment of the invention and including a wheel spinner 10 and a conveyor 12. The conveyor 12 includes a roller chain 14, which travels in its upper course along horizontal upper guides 16 and lower guides 18 below a track 20 on which the wheels of one side of a car to be washed roll. The chain is endless, lies generally in a vertical plane and has a lower course (not shown). The chain includes rollers 22, which roll on the lower guides 18, and rollers 24, which engage the upper guides 16 when pushers 26 are extended upwardly and engage the wheels of cars to be washed. When the pushers 26 are not extended upwardly, pusher rollers 28 of the pushers 26 roll along the lower guides 18. The chain 14 is endless and has a lower course directly below its upper course.

The wheel spinner 10 is mounted in a cut-out or discontinuity between portions of the guides 16 and 18, and has upper, bypass guides 30 connecting the upper guides 16 and lower, bypass guides 32 connecting the lower guides 18. The guides 30 and 32 deflect the chain 14 down under the past the wheel spinner and then back up to the level of the top of the wheel spinner.

The wheel spinner 10 includes powered rolls 40 and idler rolls 42 positioned between the powered rolls 40 and at the end portions of the wheel spinner. The rolls 40 and 42 are mounted in two, opposed rows defining a slot 44 between the rows, and the rolls of one row are staggered relative to or offset midway between the rolls of the other row as best shown in FIG. 1.

The powered rolls are knurled and are mounted cantilever by shaft portions 46 (FIG. 3) journaled in bearings 48 supported by longitudinal frame members 50 and 52 secured to cross-frame members 54 and 56. Outer longitudinal frame members 58 bolted to cross-frame members 60 carry hydraulic motors 62 coupled by releasable couplings 64 to the shaft portions 46. The motors 62 are detachably mounted in cantilever arrangement on the members 68. The idler rolls 42 are mounted in cantilever style on the members 50 and 52 by bearings (not shown) like the bearings 48. A conveyor frame 70 supports the members 50 and has cross-members 72 rigidly secured to longitudinal members 74. The members 50 are detachably secured by bolts 76 to end portions of side flanges 78 of the tire track 20, which is rigid with the conveyor frame. In assembling, after the guides 30 and 32 have been installed to form a deflecting or bypassing continuation of the guides 16 and 18, unitary halves 80 and 82 of the wheel spinner 10 are installed and rigidly secured in place by the bolts 76. The guides 30 are rigidly secured to longitudinal member 84 rigidly secured to the conveyor frame. The guides 30 and 32 are generally U-shaped to deflect the chain 14 and provide clearance for the rolls 40 and 42. The guides 30 and 32 are generally S-shaped.

Each of the pushers 26 includes an arm 90 pivoted on axle 92 carried by links 94 of the chain 14 and supporting the rollers 24. The outer or free end of the arm 90 carries an axle 96, on which the wheel engaging and pusher rollers 24 are mounted. Track engaging rollers 98 are mounted on the end portions of the axle 96 and support the rollers 24 up off the track so that the rollers 24 are free to rotate from engagement with a tire 100 of a car independently of the rollers 98. The pushers 26 are pulled by the conveyor chain from right to left as viewed in FIG. 2, and are selectively actuated between an upper, operative position as shown in full lines in FIG. 2 and a lower retracted position as shown in phantom lines in FIG. 2 just to the left of the full line position shown, this selective actuation occurring in a portion of the conveyor preceding the wheel spinner 10, the guides 30 guiding the rollers 98 under the rolls 40 and 42 of the wheel spinner when the pusher is retracted.

When the pusher 26 is in its extended or operative position and the upper course of the chain 14 is moved to the left, as viewed in FIGS. 1 and 2, the pusher engages the tire or wheel 100 of the car and pushes the car to the left along the track 20, the wheel 100 and the other wheel on the same side of the car moving along the track between guide rails 102. When each wheel 100 gets to the wheel spinner, a limit switch actuator (not shown) causes the motors 62 to run, a motor (not shown) of a wheel brush 110 to rotate the brush 110 and the brush 110 to be held in engagement with the wheel on the spinner 10. The rolls 42 are driven to rotate the wheel at a high speed which aids brush 110 in cleaning the wheel, the conveyor moving the car along the spinner. Filler rolls 112 cantilever mounted on the members 50 aid in supporting the rollers 98 as the latter is moved over the spinner. The rolls 40 preferably are knurled.

EMBODIMENT OF FIGS. 4–6

A car wash conveyor and wheel spinner construction forming an alternate embodiment of the invention includes a wheel spinner 120 and a conveyor 122. The wheel spinner 120 includes two halves 124 bolted to wheel supporting tracks 126 having sections cut out to accommodate the halves 124. The conveyor 122 is identical to the conveyor 12 and is not shown in detail, U-shaped deflecting guides 128, like the guides 30 and 32, being provided to deflect the conveyor chain under and past the wheel spinner. The conveyor has selectively extendable pushers 130 like the pushers 26.

Each half 124 of the wheel spinner 120 includes a longitudinal frame member or plate 140 bolted to longitudinal portions of the tracks 126 and carrying a drive frame 142 and an idler frame 144. The drive frame includes a bottom plate 146, end plates 148 and 150, bearing supporting plates 152 and motor supporting plates 154. A hydraulic motor 156 mounted on the plate 154 drives flanged pinions 158 to drive timing belts 160. The pinions are cantilever mounted in bearings 162 and 164 supported by the plates 140 and 152. Idler rolls 166 are cantilever mounted by bearings 168 supported by the plates 140 and 152.

An end idler roll 170 is cantilever mounted by bearings 172 supported by the plates 140 and 152. Closely spaced idler rolls 174 are cantilever mounted by axles 176 bolted to the plate 140 with bearings (not shown) on the axles. An end idler roll 180 is cantilever mounted by bearings 182 carried by a plate 184 and a plate 186 of a carriage or slide 188 adjustable on the idler frame 144 by an adjustment screw 190 screwed through a lug 192 on the frame 144. Flanged idler rolls 194 guide the timing belts 160, and are keyed to a shaft 196 journaled in bearings 198 carried by plates 200 and 202 of a slide or carriage 204 mounted adjustably on the frame 144 by adjustment screw 206 screwed through lug 208 on the frame 144 and extending loosely through a hole 210 in plate 212 of the slide 204. Idler rolls 214 are carried by bearings 216 carried by the slide 204. The rolls 180 and 214 and pulleys 194 extend loosely through slots (not shown) in the plates 140 to permit adjustment of the slides 188 and 204 for tightening the timing belts 160 and idler timing belts 218, which are turned inside out to mesh with the timing belts 160. The timing belts 160 are internally toothed and the timing belts 218 are externally toothed. The two pairs of belts 160 support each wheel of one side of the car, and rotate each wheel much faster than the wheel would rotate as the car is rolled along by the conveyor. The smooth inside faces of the belts 218 engage the rolls 174 and travel smoothly thereover and support the fractional weight of the car as each car wheel is on and spun by the timing belts 160. A wheel scrubbing brush (not shown) like the brush 110 (FIG. 3) brushes the lower portion of the wheel on the spinner 120. The pusher 130 has an arm 230 adapted to travel through the slot between the two spinner halves 124.

What is claimed is:

1. In combination,
    a track along which wheels of one side of a car may be rolled,
    a wheel pushing conveyor including a chain and pusher means pulled by the chain and adapted to engage one of the wheels to push the car along the track,
    means for guiding the chain along a path having a first portion at one level and a second portion at a lower level,
    wheel spinning means including wheel spinning elements positioned over the portion of the chain in said second portion,
    and brush means for brushing the wheel,
    the wheel spinning means having a slot extending longitudinally of the track,
    the pusher means including a pusher for engaging the wheel and an arm connecting the pusher and the chain and extending through and movable along the slot,
    the wheel spinning means including a pair of endless belt means on opposite sides of the slot and drive means for driving the belt means.

2. The combination of claim 1 wherein each belt means comprises a toothed timing belt having inner teeth and toothed driving pulley means engaging the teeth.

3. The combination of claim 2 wherein each belt means includes an inner timing belt having outer teeth meshing with the teeth of the toothed timing belt along the central portion of the upper course of the toothed timing belt, and guide means supporting the upper course of the inner timing belt.

4. The combination of claim 3 wherein the guide means includes a plurality of cantilever mounted rollers.

5. The combination of claim 3 wherein each inner timing belt is substantially shorter than the toothed timing belt so as to leave a space at one end of the toothed timing belt, and the drive means includes a toothed pulley mounted in that space.

6. The combination of claim 5 wherein the inner timing belt and the toothed timing belt leave a second space at the other end of the toothed timing belt, and including an idler pulley positioned in the second space and mounting the toothed timing belt.

7. In combination,
    a track along which wheels of one side of a car may be rolled,
    a wheel pushing conveyor including a chain and pusher means pulled by the chain and adapted to engage one of the wheels to push the car along the track,
    means for guiding the chain along a path having a first portion at one level and a second portion at a lower level,
    wheel spinning means including wheel spinning elements positioned over the portion of the chain in said second portion,
    brush means for brushing the wheel,
    the wheel spinning means having a slot extending longitudinally of the track,
    the pusher means including a pusher for engaging the wheel and an arm connecting the pusher and the chain and extending through and movable along the slot,
    the wheel spinning means including pairs of wheel driving means and mounting means positioning the wheel driving means on opposite sides of the slot,
    the wheel driving means including aligned pairs of driving rollers adapted to be contacted by the wheel and means for rotating the rollers to rotate the wheel,
    and pairs of filler rollers positioned between the pairs of the driving rollers.

8. The combination of claim 7 including cantilever support means mounting the wheel driving rollers and the filler rollers.

9. The combination of claim 8 wherein the filler rollers are of a diameter a small fraction of that of the driving rollers, the upper peripheries of all the rollers being at substantially the same level.

10. The combination of claim 7 wherein the driving rollers are of a predetermined diameter and are spaced close together on each side, and the filler rollers are of a diameter a small fraction of that of the driving rollers and are positioned between the upper portions of the driving rollers.

* * * * *